(12) United States Patent
Kairali et al.

(10) Patent No.: US 11,556,238 B1
(45) Date of Patent: Jan. 17, 2023

(54) IMPLEMENTATION OF ARCHITECTURE DOCUMENT VIA INFRASTRUCTURE AS CODE

(71) Applicant: International Business Machines Corporation, Armonk, NY (US)

(72) Inventors: Sudheesh S. Kairali, Bangalore (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/579,353

(22) Filed: Jan. 19, 2022

(51) Int. Cl.
*G06F 3/0486* (2013.01)
*G06F 3/0481* (2022.01)
*G06F 40/186* (2020.01)
*G06F 9/451* (2018.01)

(52) U.S. Cl.
CPC .......... *G06F 3/0486* (2013.01); *G06F 3/0481* (2013.01); *G06F 9/451* (2018.02); *G06F 40/186* (2020.01)

(58) Field of Classification Search
None
See application file for complete search history.

(56) References Cited

U.S. PATENT DOCUMENTS

| 10,564,987 | B1 | 2/2020 | Lépine et al. |
| 10,924,559 | B1 | 2/2021 | Kubik et al. |
| 2016/0149769 | A1 | 5/2016 | Joshi et al. |
| 2019/0079750 | A1 | 3/2019 | Foskett et al. |
| 2020/0012480 | A1* | 1/2020 | Rizo ..................... G06F 21/577 |
| 2020/0387357 | A1* | 12/2020 | Mathon ................. G06F 9/4411 |
| 2022/0052910 | A1* | 2/2022 | Neelakantam ...... G06F 11/3034 |

OTHER PUBLICATIONS

Kasthuri; Magesh ("Shorticle 555—Reverse Engineering of Cloud Infrastructure using Cycloid TerraCognita"), pp. 1-3. (Year: 2021).*
Azure Architecture Center (Repeatable Infrastructure), pp. 1-3. (Year: 2020).*
Blanchard et al., Repeatable Infrastructure, published in Azure Product Documentation, Oct. 15, 2020, https://docs.microsoft.com/en-us/azure/architecture/framework/devops/automation-infrastructure.

* cited by examiner

*Primary Examiner* — Daniel Rodriguez
*Assistant Examiner* — Gabriel Mercado

(57) ABSTRACT

An example operation may include one or more of storing, in memory, a cloud architecture document of a cloud computing environment, transforming the cloud architecture document into infrastructure as code (IaC) based on predefined code and storing the IaC in a machine-readable file, deploying the cloud computing environment via a host platform, and executing the machine-readable file and automatically configuring cloud resources of the cloud computing environment based on the IaC included in the machine-readable file.

20 Claims, 14 Drawing Sheets

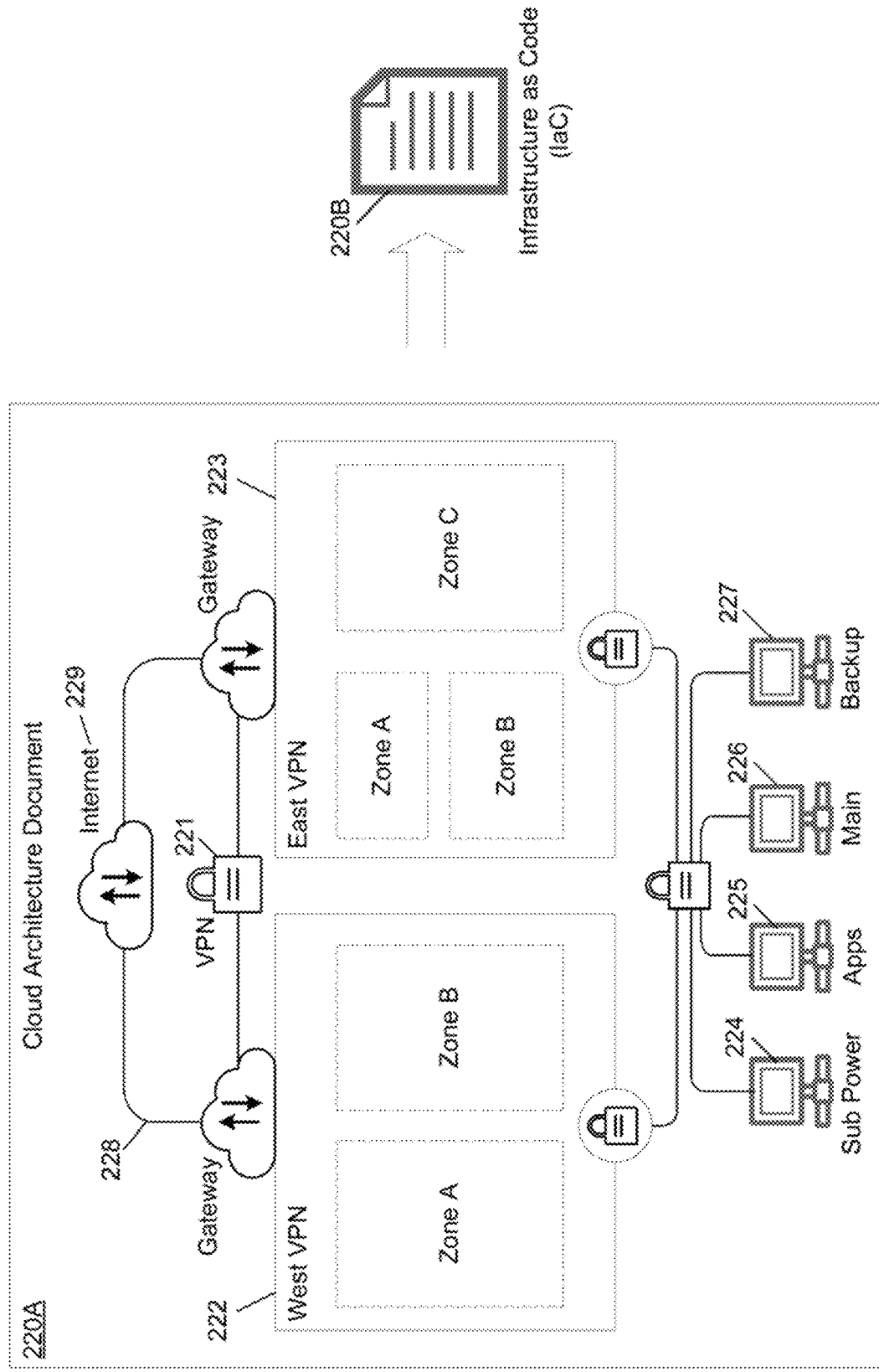

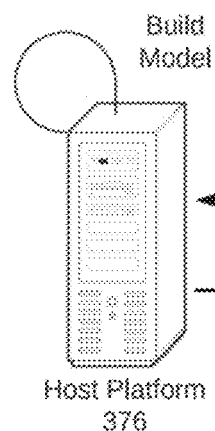
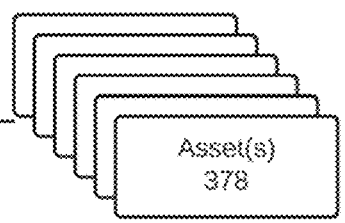
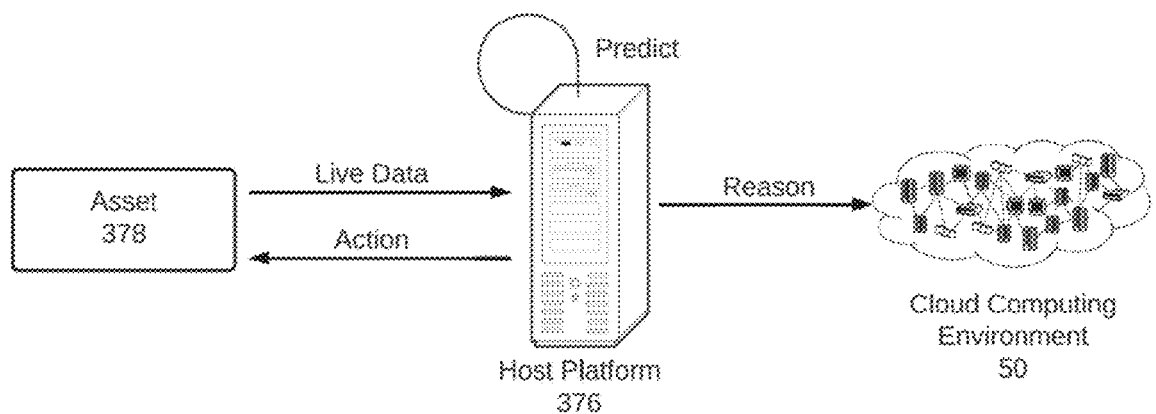
FIG. 3D

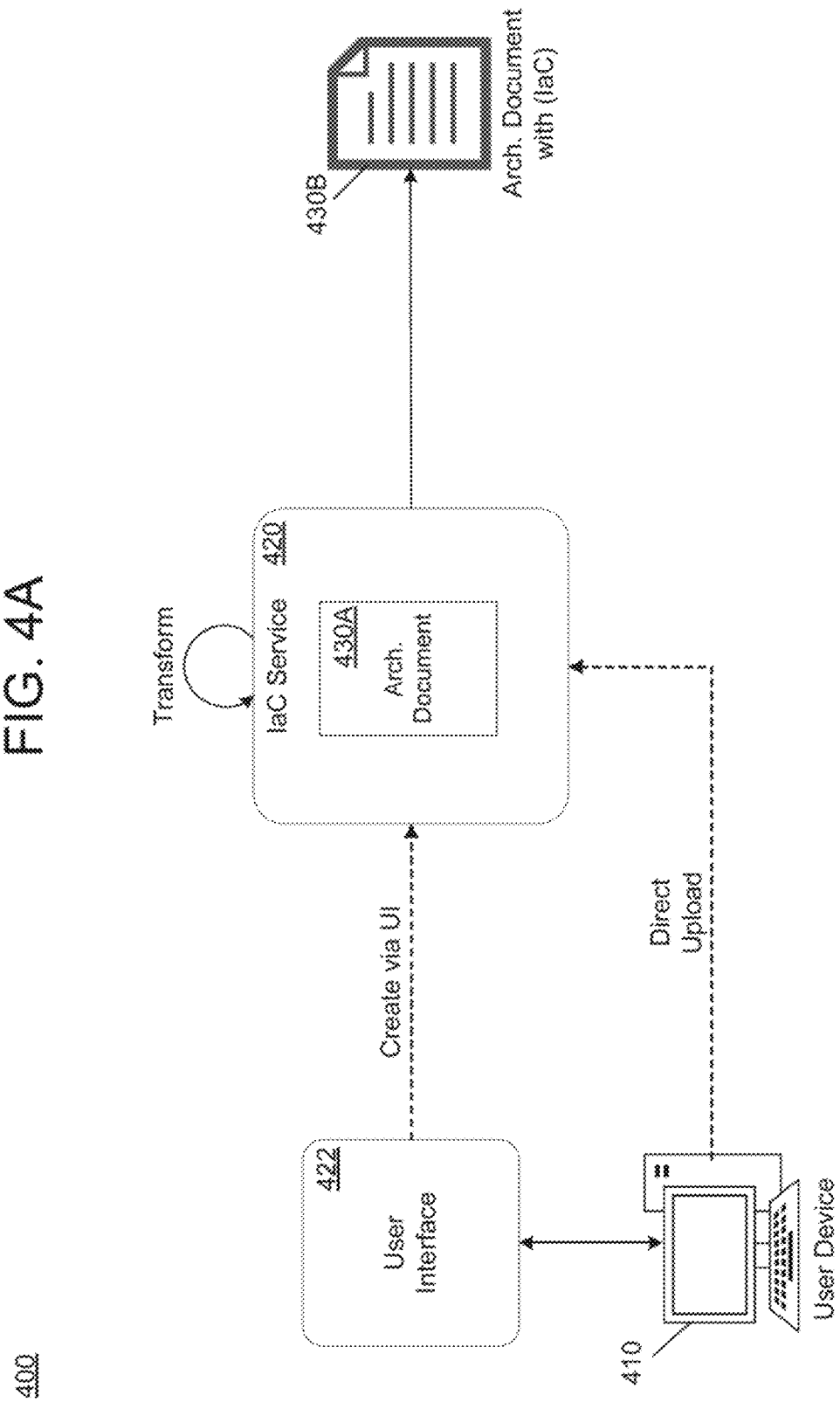

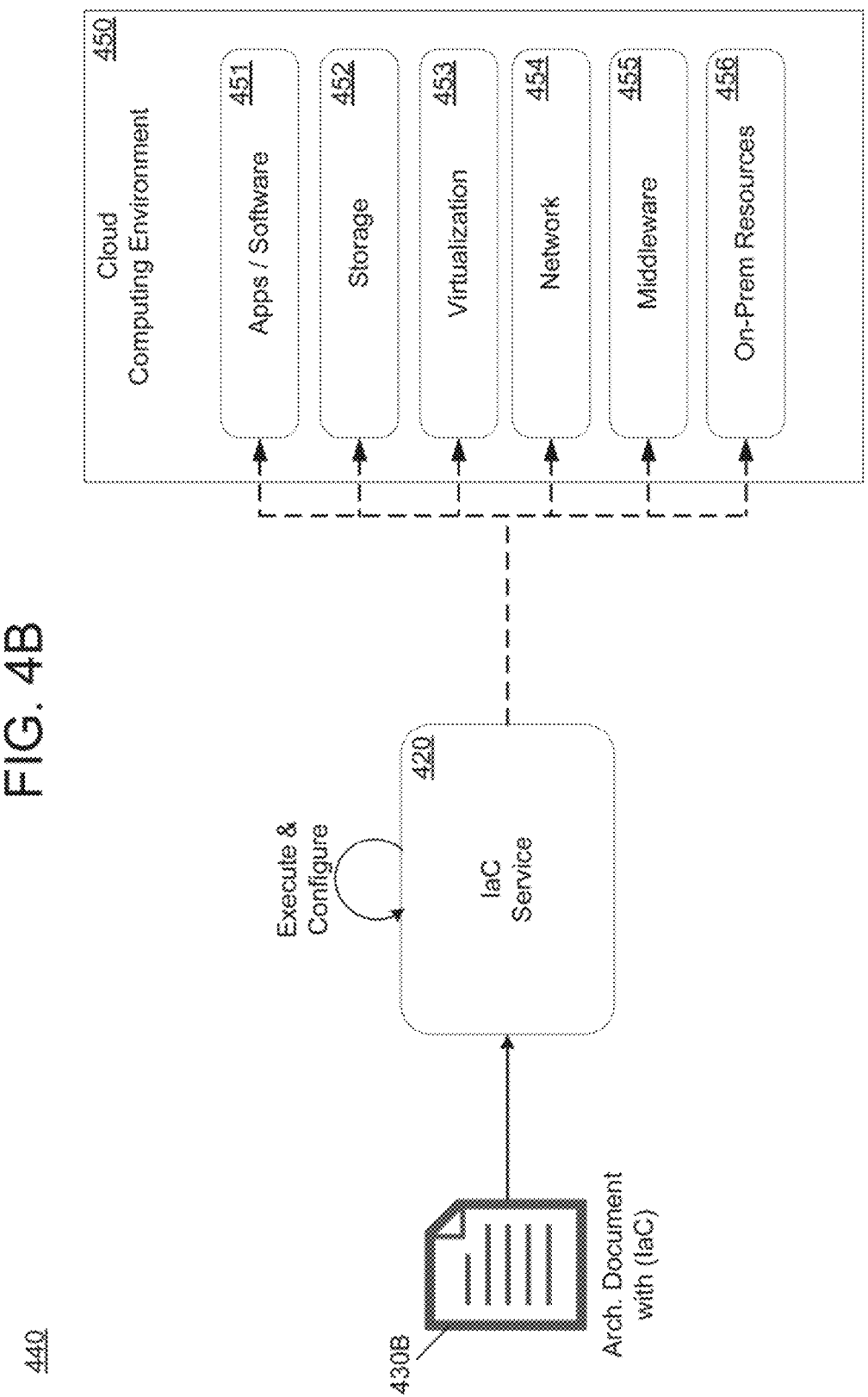

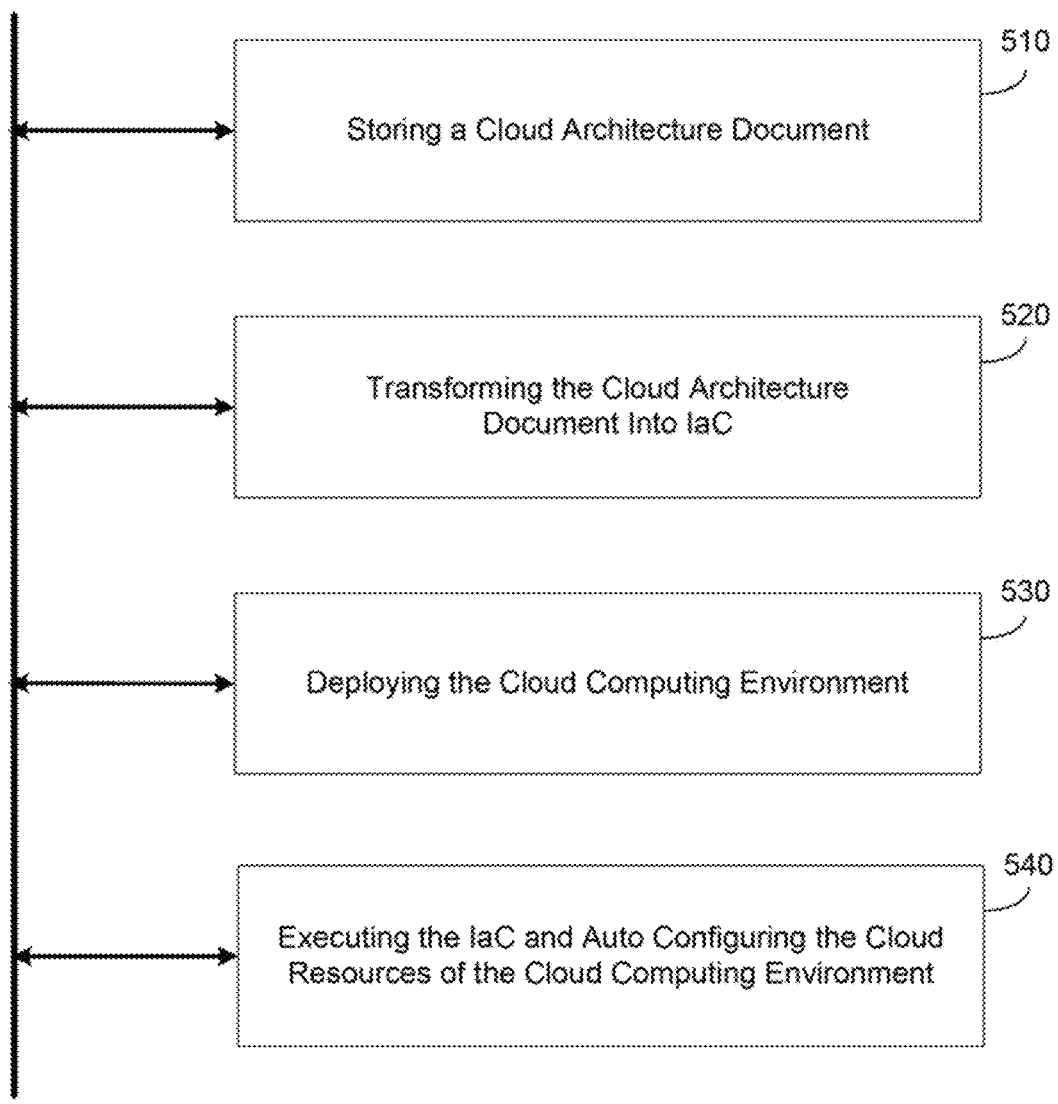

IMPLEMENTATION OF ARCHITECTURE DOCUMENT VIA INFRASTRUCTURE AS CODE

BACKGROUND

Cloud computing architecture refers to the components and subcomponents required for cloud platform which may include, but is not limited to, storage, accessibility, software capabilities, applications, hybrid cloud components including on-premises components, middleware, and other cloud resources. In some cases, the cloud computing architecture may be virtual, referred to herein as Infrastructure as a service (IaaS). A cloud architecture document or diagram is often used to facilitate a user, such as a cloud operator, in setting up and configuring the components of the cloud computing platform. The cloud architecture document may visually depict the cloud components/sub-components and the relationships between them.

However, when deploying a cloud solution based on a cloud architecture document, the cloud operator must visually inspect and comprehend the depictions and relationships in the document and manually input configurations into a user interface to integrate the cloud resources together using input commands. In other words, a user must manually configure settings for and interconnect the cloud components such as storage, a virtual network, applications, capabilities, and other various components. The process can take the person a significant amount of time.

SUMMARY

One example embodiment provides an apparatus that includes a memory configured to store a cloud architecture document of a cloud computing environment, and a processor configured to one or more of transform the cloud architecture document into infrastructure as code (IaC) based on predefined code and store the IaC in a machine-readable file, deploy the cloud computing environment via a host platform, and execute the machine-readable file and automatically configure cloud resources of the cloud computing environment based on the IaC included in the machine-readable file.

Another example embodiment provides a method that includes one or more of storing, in memory, a cloud architecture document of a cloud computing environment, transforming the cloud architecture document into infrastructure as code (IaC) based on predefined code and storing the IaC in a machine-readable file, deploying the cloud computing environment via a host platform, and executing the machine-readable file and automatically configuring cloud resources of the cloud computing environment based on the IaC included in the machine-readable file.

A further example embodiment provides a computer-readable medium comprising instructions, that when read by a processor, cause the processor to perform one or more of storing, in memory, a cloud architecture document of a cloud computing environment, transforming the cloud architecture document into infrastructure as code (IaC) based on predefined code and storing the IaC in a machine-readable file, deploying the cloud computing environment via a host platform, and executing the machine-readable file and automatically configuring cloud resources of the cloud computing environment based on the IaC included in the machine-readable file.

BRIEF DESCRIPTION OF THE DRAWINGS

FIG. 2B is a diagram illustrating a process of transforming an architecture document into infrastructure as code (IaC) according to an example embodiment.

FIG. 3D is a diagram illustrating machine learning process via a cloud computing platform according to an example embodiment.

FIG. 4A is a diagram illustrating a process of creating infrastructure as code according to an example embodiment.

FIG. 4B is a diagram illustrating a process of automatically configuring a cloud platform based on the infrastructure as a code generated in FIG. 4A, according to an example embodiment.

FIG. 5 is a diagram illustrating a method of generating an architecture document as infrastructure as code (IaC) according to an example embodiment.

DETAILED DESCRIPTION

Figure 1:
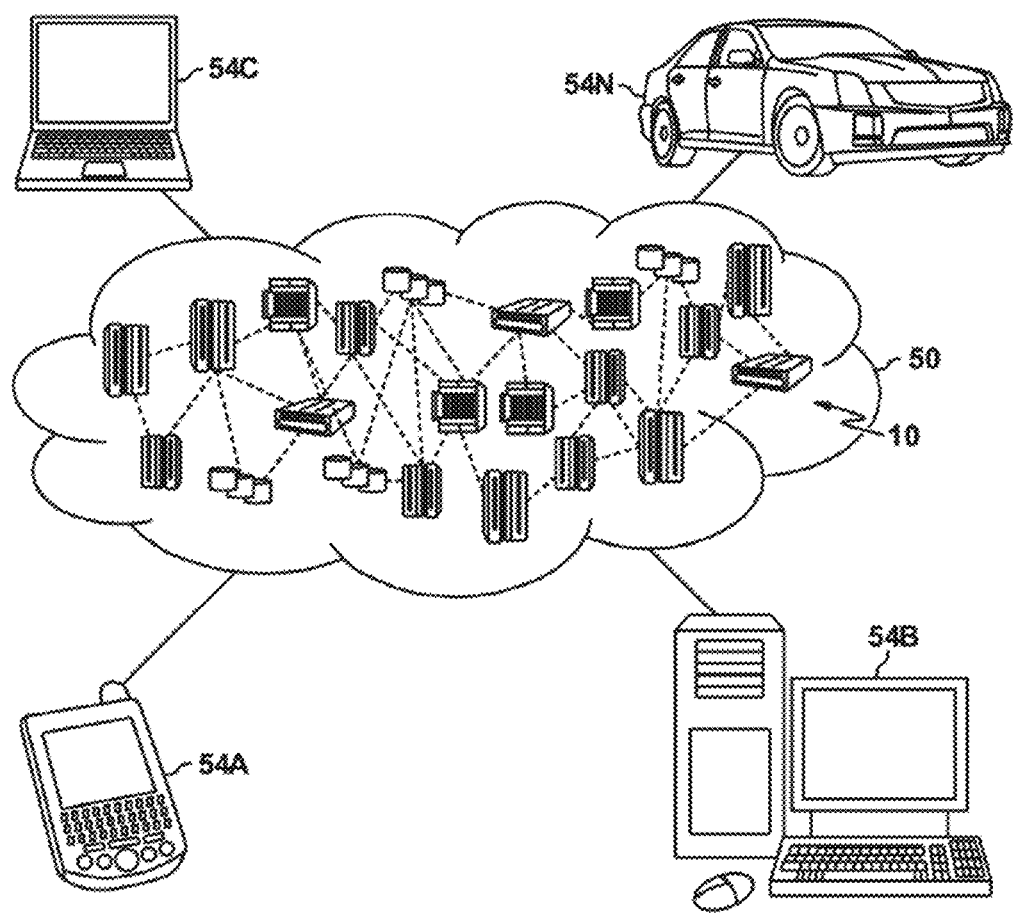
FIG. 1 is a diagram illustrating a cloud computing environment that interacts with various devices according to an example embodiment.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud architecture refers to the various components of the cloud computing environment. For example, a cloud architecture may include a front-end platform, a back-end platform, a cloud-based delivery, and a network infrastructure. To illustrate the relationships and the configurations among the components of these systems, a cloud architecture document/diagram may be used. Organizations tend to have their own designs and content for a cloud architecture document. But for the most part, a cloud architecture document provides a visual representation of traditional cloud computing components as well as the configurations and relationships among them. Conventionally, the purpose of the document is for viewing by a user, such as a cloud operator, when setting up the cloud computing environment. In this scenario, the user reads/comprehends the configuration of the cloud platform from the diagram/document and then manually inputs commands into a user interface, etc. to implement the settings/configuration within the cloud computing environment. However, all of these steps are performed by a human.

The example embodiments overcome the drawbacks noted above by transforming a cloud architecture document into infrastructure as code (IaC). Furthermore, the IaC can be executed to automatically configure components of a corresponding cloud platform environment associated with the cloud architecture document. For example, the system herein may map cloud resources in the document to pre-defined code modules for configuring the various cloud resources. Accordingly, a user is no longer required to manually configure the cloud computing environment by viewing/comprehending a visual representation in a document. Instead, a computing system such as the host platform where the cloud computing environment is being deployed can automatically configure the components of the cloud computing environment. By taking the user out of the process, or at least reducing the need for the user, the entire overall process can be performed significantly faster, and with less mistakes.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Examples of cloud computing characteristics that may be associated with the example embodiments include the following.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Examples of service models that may be associated with the example embodiments include the following:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Examples of deployment models that may be associated with the example embodiments include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

According to various embodiments, a cloud architecture document may be replaced with infrastructure as code (IaC). Different organizations have different formats and designs for a cloud architecture document. In general, the cloud architecture document visually depicts cloud resources such as storage, network, virtualization, security, applications, etc., in a diagram with various configuration information regarding the interactions among the cloud resources.

Meanwhile, IaC is the management of computing infrastructure such as networks, virtual machines, load balancers, and connection topology, via code. In particular, machine readable files may include commands for configuring the computing infrastructure. There are different approaches including a declarative approach in which the IaC defines a desired state of configuration and the computing infrastructure executes what happens to achieve that state or an imperative approach in which specific commands are issued to by the IaC to the computing infrastructure components to achieve the desired state.

In the example embodiments, a reference architectural document or more simply architecture document will be having identifiers (typically visual) of each and every architectural component, and how these architectural components communicate with each other including networking information and restrictions on accessibility. For example, the architectural document may include detailed architectural implementations that identify what types of cloud resources are required, and how they are connected to one another. The system has an "infrastructure as code" module/service, which may generate the required IaC code to create cloud resources and integrate the IaC code into the cloud architecture document or some other machine-readable file.

The system may include an AI enabled requirement analysis module that can analyze the requirements of a cloud solution to customize the "infrastructure as code". Per the reference architectural document, the system can obtain detailed cloud resources and associated textual information. This data can be used by the system to create an IaC layer that is then added over the existing reference architectural document. For example, the system may create two layers within the reference architectural document, where one is the existing reference architectural diagram/text content, etc. and the other layer is IaC code modules. Here, the "infrastructure as code" layer may be dynamically modified based on any changes in the reference architectural document, for example, entered via a user interface.

The architect may select a required reference architectural document from a list of predefined reference architectural documents or may create a new/custom architectural document via the user interface. The architect may provide business requirements in either case. The business requirements may specify how the different systems interact, virtualization, network requirements, accessibility restrictions, the data and applications that are stored and accessed by the different systems, and the like. Based on the defined requirements, the system may update or otherwise modify the reference architectural document with IaC.

Once the reference architectural document is updated, the system may identify which portion and nodes of the reference architectural document have been updated. Based on the updation of the reference architectural document, the "infrastructure as code" service may identify what changes is to be applied to any existing IaC layer for the reference architectural document. The system may synchronize/align the changed reference architectural document in the first layer of the document with the "infrastructure as code" in the second layer of the reference architectural document.

In addition, the architect can selectively identify different portion of the reference architecture document for cloud resource creation. The system may execute the "infrastructure as code" and accordingly the cloud resources will be created. The architect can reverse engineer any existing cloud solution, and accordingly the "infrastructure as code" may create the code and align the code with the same position in the reference architectural document. The architect can modify the reference architectural document, and accordingly the associated "infrastructure as code" via the user interface, and the IaC service/module will modify the deployment of the corresponding cloud infrastructure. In some embodiments, the architect can merge two or more reference architectural document, as per the business process workflow, via the user interface. Furthermore, based on the merging of the reference architectural document, the IaC service/module may update the infrastructure as code layer. Furthermore, via the user interface, the architect can deploy the said reference architecture document and accordingly the cloud resources will be created based on executing the IaC in the architecture document.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2A:
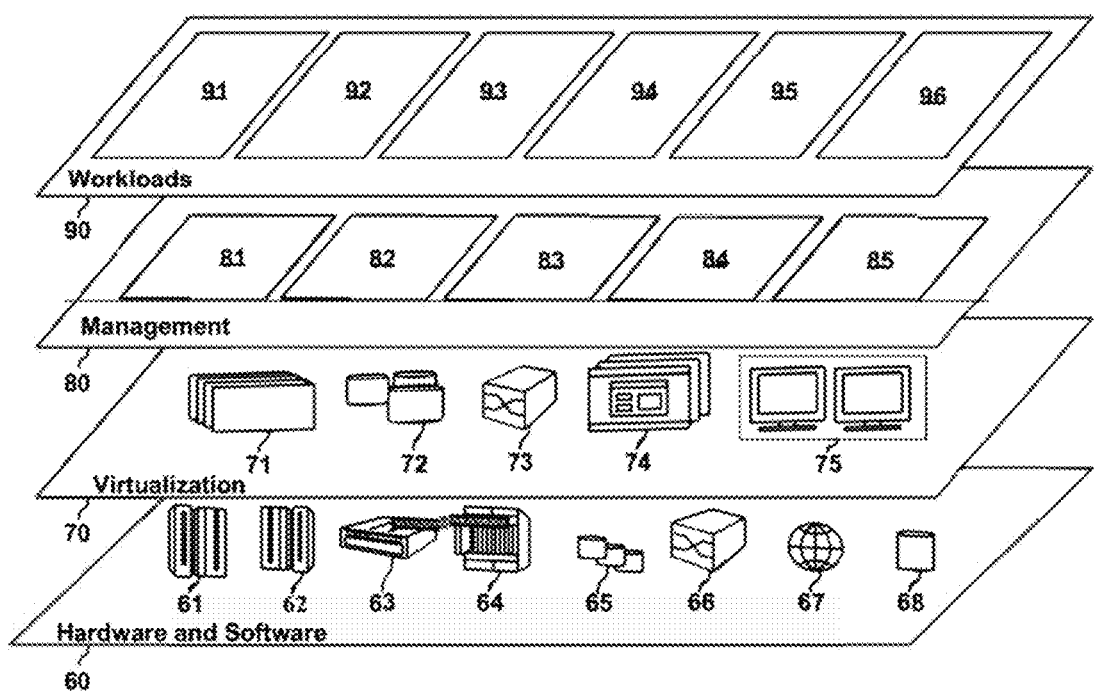
FIG. 2A is a diagram illustrating abstraction model layers of a cloud computing environment according to an example embodiment.

Referring now to FIG. 2A, a set of functional abstraction layers provided by cloud computing environment 50 (FIG. 1) is shown. It should be understood in advance that the components, layers, and functions shown in FIG. 2A are intended to be illustrative only and embodiments of the invention are not limited thereto. As depicted, the following layers and corresponding functions are provided: Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and other processing 96.

An architecture document, such as those commonly used when deploying and configuring a computing architecture of a cloud platform which, can be used to visually represent various components of the hardware and software layer 60, the virtualization layer 70, the management layer 80 and the workload layer 90. According to various embodiments, the architecture document can be updated to include infrastructure as code (IaC) that automatically configures the cloud architecture on the host platform.

For example, FIG. 2B illustrates a process 210 of transforming an architecture document 220A into an architecture document 220B that includes infrastructure as code (IaC) according to an example embodiment. In the example of FIG. 2B, the cloud architecture document 220A includes various components 221-229 which are visually depicted therein. The components may include devices, applications, networks, virtual environments, and the like, as well as relationship lines 228, and descriptions 229. It should be appreciated that the design of the cloud architecture document 220 is not limited to the component types and the relationships that are shown in the example of FIG. 2B. In other words, the cloud architecture document 220 shown in FIG. 2B is just one example, and other styles, formats, arrangements of components, types of components, and the like, are possible.

Figure 2C:
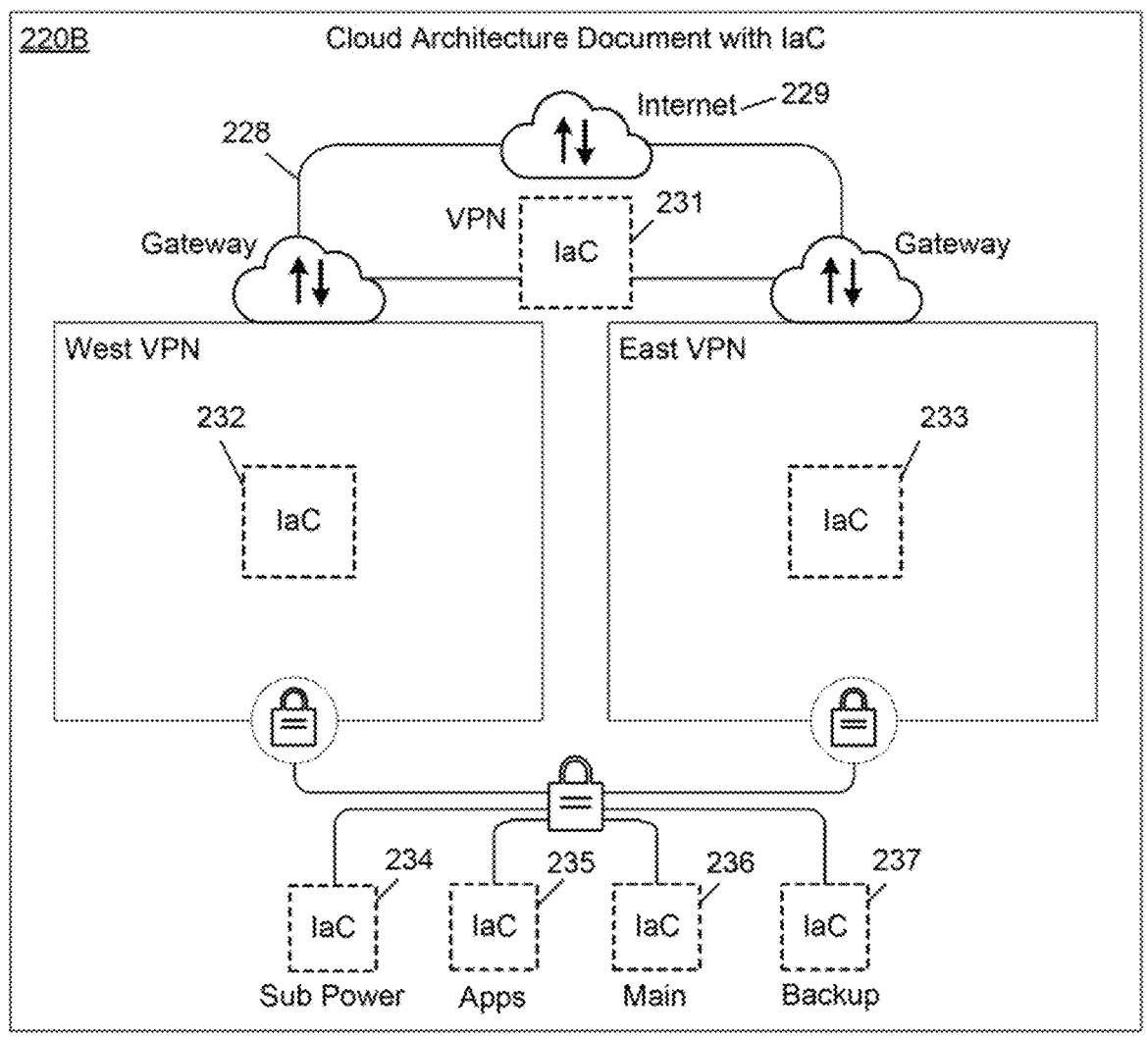
FIG. 2C is a diagram illustrating an architecture document that includes infrastructure as code according to an example embodiment.

According to various embodiments, a system (e.g., a software program, etc.) may be executed on the same host platform where the cloud computing environment is to be deployed (or another platform, device, etc.), to convert the cloud architecture document 220A into the cloud architecture document 220B which includes infrastructure as code (IaC). In some embodiments, the IaC 230 may be integrated back into the same architecture document. For example, an IaC layer with machine-readable and machine-executable IaC code can be added to the document and replace various design components with code modules such as shown in the example of FIG. 2C. Here, the cloud resources 221-227 shown in the cloud architecture document 220A have been replaced with IaC code modules 231-237. Some of the attributes may remain unchanged such as the relationship lines 228 and the descriptions 229.

Thus, the cloud architecture document 220B includes code (e.g., machine-readable and machine-executable instructions) that can be executed to automatically configure a physical and/or virtual cloud computing environment according to the visual representation in the cloud architecture document. For example, the system may identify the components 221-227 within the cloud architecture document 220A, and generate the IaC code 231-237 for configuring the identified components 221-227 based on configuration settings in the cloud architecture document 220A. As one example, the software may map the different components 221-227 to predefined code modules associated with the different components. Furthermore, the software may modify or otherwise adjust the code modules based on any additional requirements provided from the cloud architecture document 220A.

The cloud architecture document 220B that is integrated with IaC may be executed by simply opening the cloud architecture document 220B by the host platform and executing the IaC. Thus, the platform can automatically configure a cloud computing environment based on the configurations set forth in the IaC code modules 231-237 in the cloud architecture document 220B. This same configuration can be applied to multiple cloud computing environments. Furthermore, the configuration can easily be modified and re-used to adjust to changing cloud requirements such as upgrades, introduction of new services, change to business functionality, new/additional infrastructure being added, and the like.

For example, the system described herein may provide a graphical user interface where a user can input commands to generate the cloud architecture document 220A as shown in FIG. 2B and convert it into the cloud architecture document 220C shown in FIG. 2C. For example, the user interface may be associated with a development environment where a user can drag-and-drop components from a predefined component list and add them to a workspace area where a cloud architecture can be designed and saved. Furthermore, the user may enter in configuration information at each area of the document. When the user is ready, the user may press a button which triggers the system to convert the visual representation of the architecture in the workspace area into one or more IaC files.

Furthermore, through the same user interface, the user may modify an already generated IaC file of an existing cloud computing environment. Here, the system may output a visualization of the cloud architecture of the existing cloud computing environment in the workspace area of the user interface. The user may modify a configuration of the existing cloud computing environment by changing the components displayed in the workspace area of the user interface and/or changing configuration settings. In response, the system may automatically convert the changes into the existing IaC.

FIGS. 3A-3E provide various examples of additional features that may be used in association with the cloud computing environment.

Figure 3A:
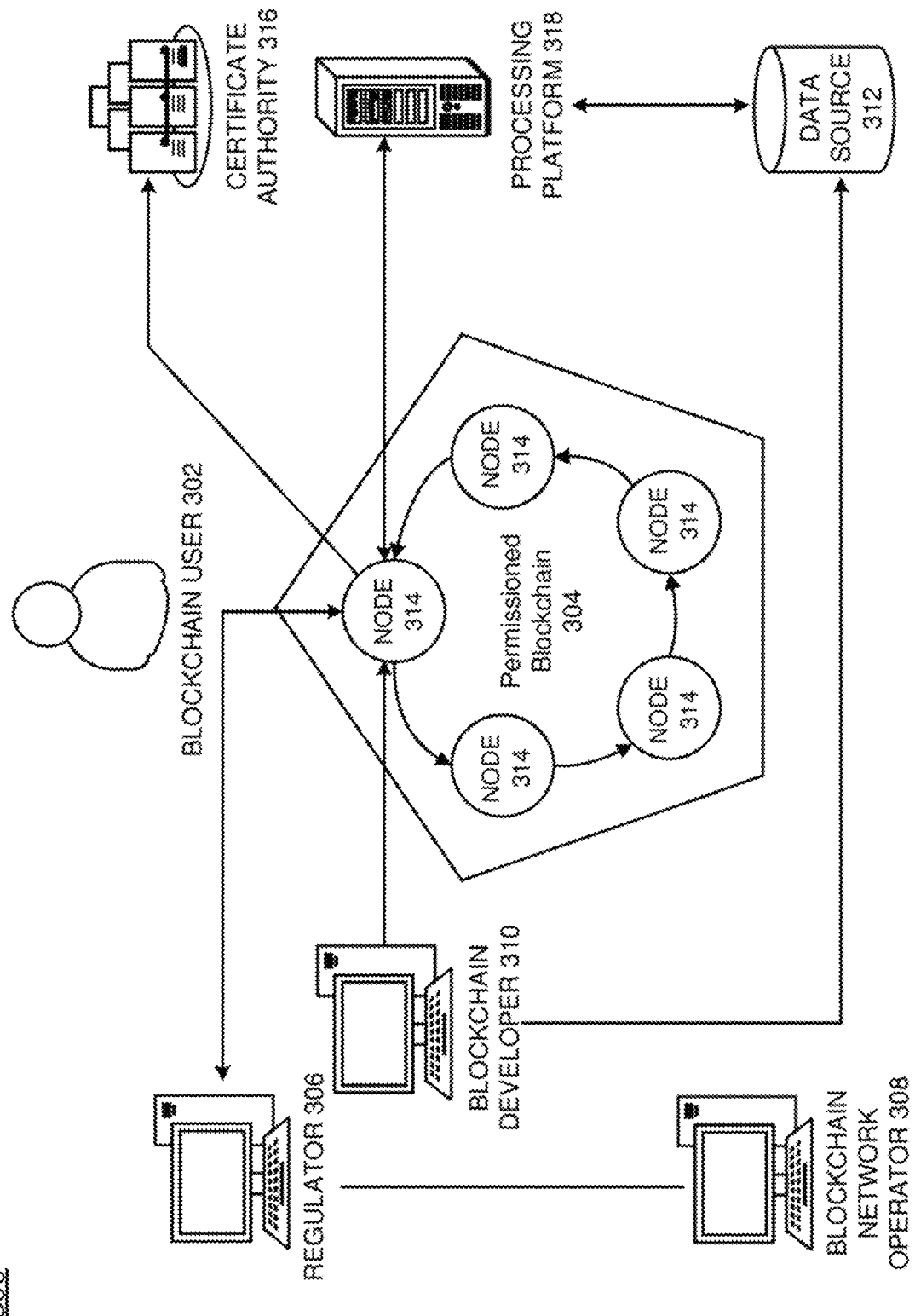
FIGS. 3A-3C are diagrams illustrating examples of a permissioned network according to example embodiments.

FIG. 3A illustrates an example of a permissioned blockchain network 300, which features a distributed, decentralized peer-to-peer architecture. The blockchain network may interact with the cloud computing environment 50, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
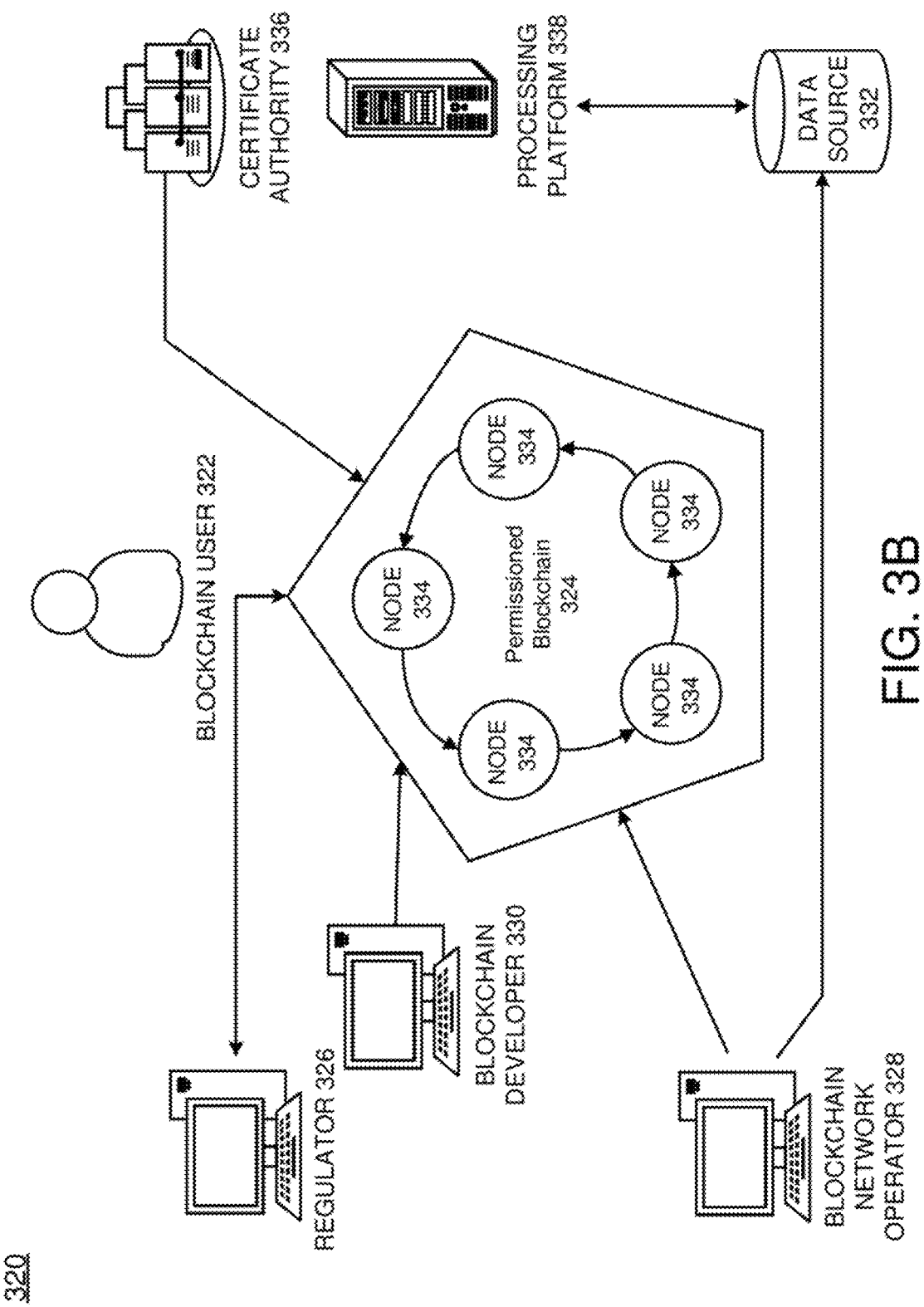

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
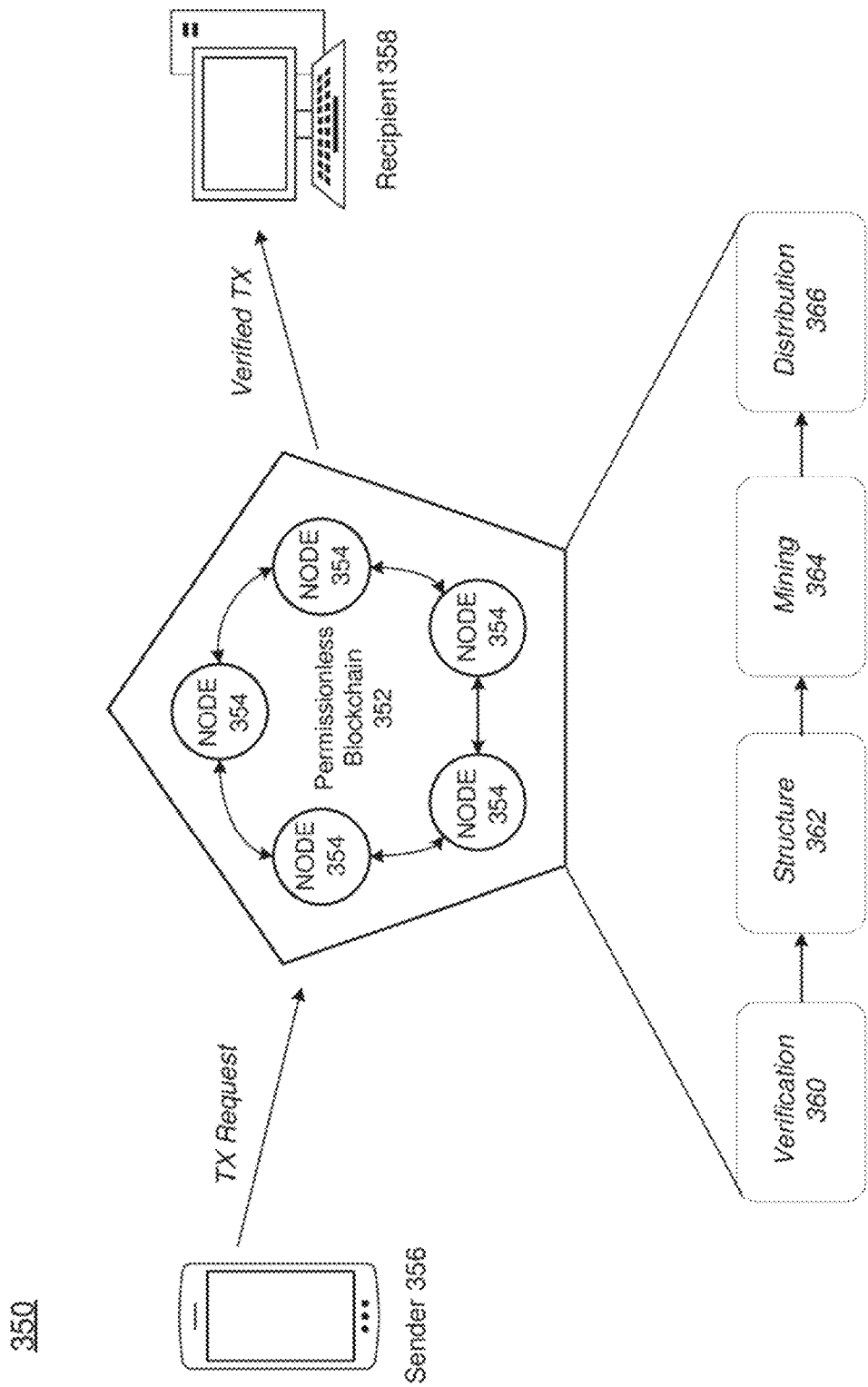

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3E:
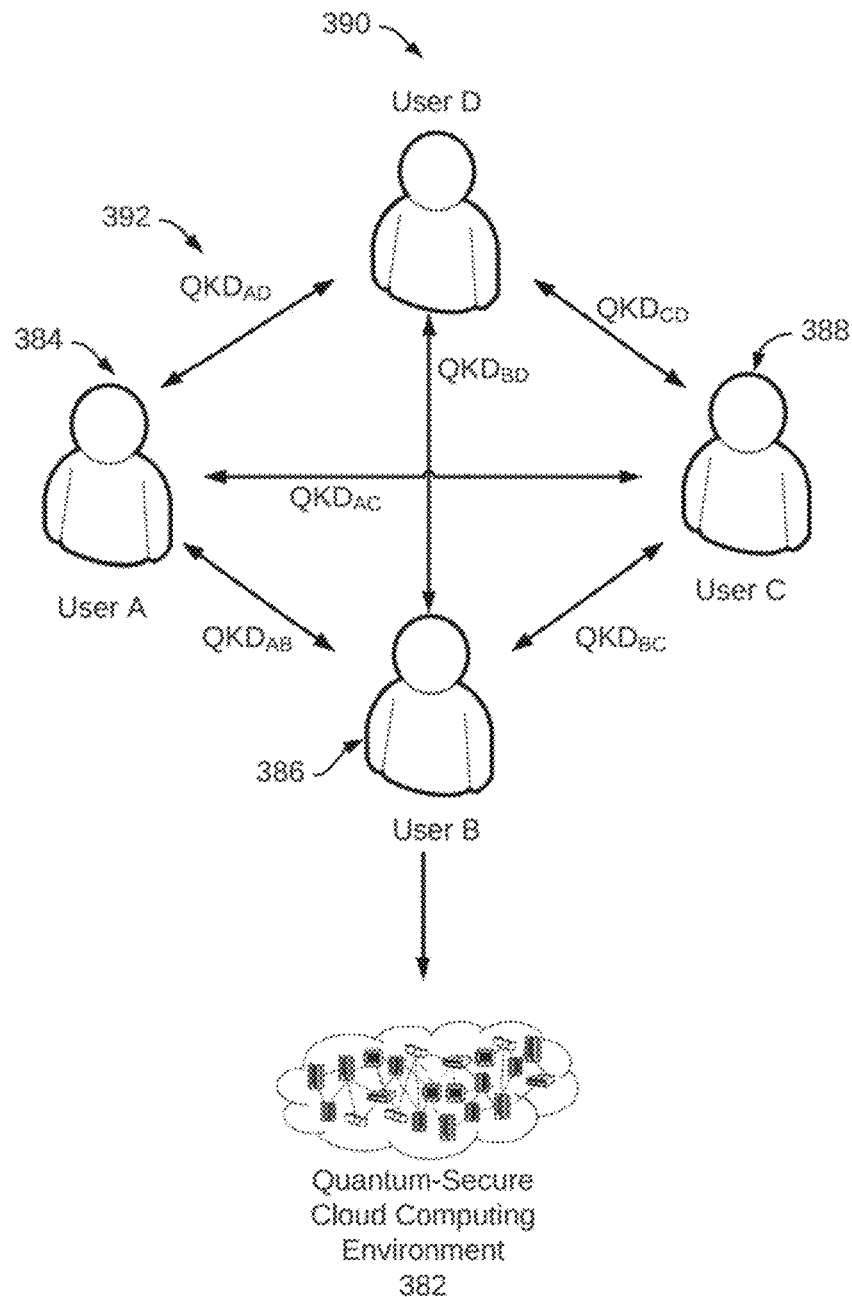
FIG. 3E is a diagram illustrating a quantum computing environment associated with a cloud computing platform according to an example embodiment.

FIGS. 3D and 3E illustrate additional examples of use cases for cloud computing that may be incorporated and used herein. FIG. 3D illustrates an example 370 of a cloud computing environment 50 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376 builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 50 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 50. This can significantly reduce the collection time needed by the host platform 376 when performing predictive model training. For example, data can be directly and reliably transferred straight from its place of origin to the cloud computing environment 50. By using the cloud computing environment 50 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the data associated therewith) may be stored on the cloud computing environment 50 by the host platform 376. Each refinement of the machine learning model (e.g., changes in variables, weights, etc.) may be stored in the cloud computing environment 50 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 50.

After the model has been trained, it may be deployed to a live environment where it can make predictions/decisions based on the execution of the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by the execution of the machine learning model at the host platform 376 may be stored on the cloud computing environment 50 to provide auditable/verifiable proof. As one non-limiting example, the machine learning model may predict a future breakdown/ failure to a part of the asset 378 and create an alert or a notification to replace the part. The data behind this decision may be stored by the host platform 376 and/or on the cloud computing environment 50. In one embodiment the features and/or the actions described and/or depicted herein can occur on or with respect to the cloud computing environment 50.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender, and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions, and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 384-390) authenticate the transaction by providing their shared secret key 392 (QKD). This quantum signature can be attached to every transaction making it exceedingly difficult to be tampered with. Each node checks its entries with respect to a local copy of the cloud computing environment 382 to verify that each transaction has sufficient funds.

As noted above in FIG. 2B, in the example embodiments, a cloud architecture document may be converted into a document with infrastructure as code (IaC) that can be executed to automatically configure a cloud computing environment associated with the cloud architecture document. Here, the IaC may be generated based on predefined code modules that can be inserted into the cloud architecture document by the system based on requirements included in a traditional cloud architecture document. In this case, the system can add a layer of code to the cloud architecture document to thereby enhance or otherwise improve the cloud architecture document with the IaC code modules for different cloud resources and architecture components.

While deploying any cloud solution, the architect needs to create various cloud resources and integrate the cloud resources to create the cloud solution. For example, the cloud resources may include a storage account, a database, a virtual network, software applications, middleware, etc. Traditionally, the architect refers to the visual setup in the cloud architecture document while manually creating the cloud resources and deploying the cloud solution. Meanwhile, in the example embodiments, the cloud document is enhanced with infrastructure as code that can be executed by the host platform to automatically create the configurations in the cloud architecture according to various embodiments. Thus, the system may convert a reference architectural document to code in a selective manner, so that the infrastructure can be created by executing the code, and will be directly aligned to the reference architectural document.

In these examples, the infrastructure as a code may be integrated back into the reference architectural document because some of the content of the reference architectural document is not related to infrastructure. The unrelated content will not be converted to code for infrastructure. In this case, tagging may be performed differently to identify which parts include IaC and which do not.

FIG. 4A illustrates a process 400 of creating a cloud architecture document 430B that is integrated with infrastructure as code according to an example embodiment. Referring to FIG. 4A, a user may use a user device 410 to create or otherwise upload a new architecture document to the host platform. Here, the host platform may include a IaC service 420 that performs the embodiments described herein. In this example, the IaC service 420 provides a user interface 422 such as a web application, a cloud application, or the like. The user interface 422 may have a workspace where a user can configure a computing architecture infrastructure such as a cloud computing platform infrastructure.

In this example, the IaC service 420 may receive inputs by the user via the user interface 422 and generate a reference architecture document 430A (e.g., with a visual representation of the infrastructure) based on the inputs via the user interface 422. For example, the user may use an input mechanism such as a finger or mouse to drag and drop infrastructure components into the design and also type in requirements or select the requirements from a predefined list. The requirements may be used to configure networks, integrate components, restrict access, and the like. In response, the IaC service 420 may create and store the architecture document 430A. As another example, the user may directly upload the architecture document 430A without a need to use the UI to create the architecture document 430A.

The user interface 422 may also provide the user with an option to transform or convert the architecture document 430A into IaC. When the user selects such option, the IaC service 420 may replace various visual components within the architecture document 430A with IaC code in the architecture document 430B.

FIG. 4B illustrates a process 440 of automatically configuring a cloud computing environment 450 within a host platform (not shown) based on the architecture document 430B with IaC generated in FIG. 4A, according to an example embodiment. Referring to FIG. 4B, by opening the architecture document 430B or hitting a request button within the user interface 422 shown in FIG. 4A, the IaC service 420 may automatically configure the architecture of the cloud computing environment 450 including infrastructure components, networks, applications, integrations, middleware, accessibility, restrictions, and the like. In this example, the IaC service 420 configures cloud resources 451, 452, 453, 454, 455, and 456 of the cloud computing environment 450 based on the IaC code in the architecture document 430B. In this example, the IaC service 420 may execute instructions with the IaC code which cause the cloud resources to be deployed and integrated together in a configured architecture/infrastructure.

Figure 4C:
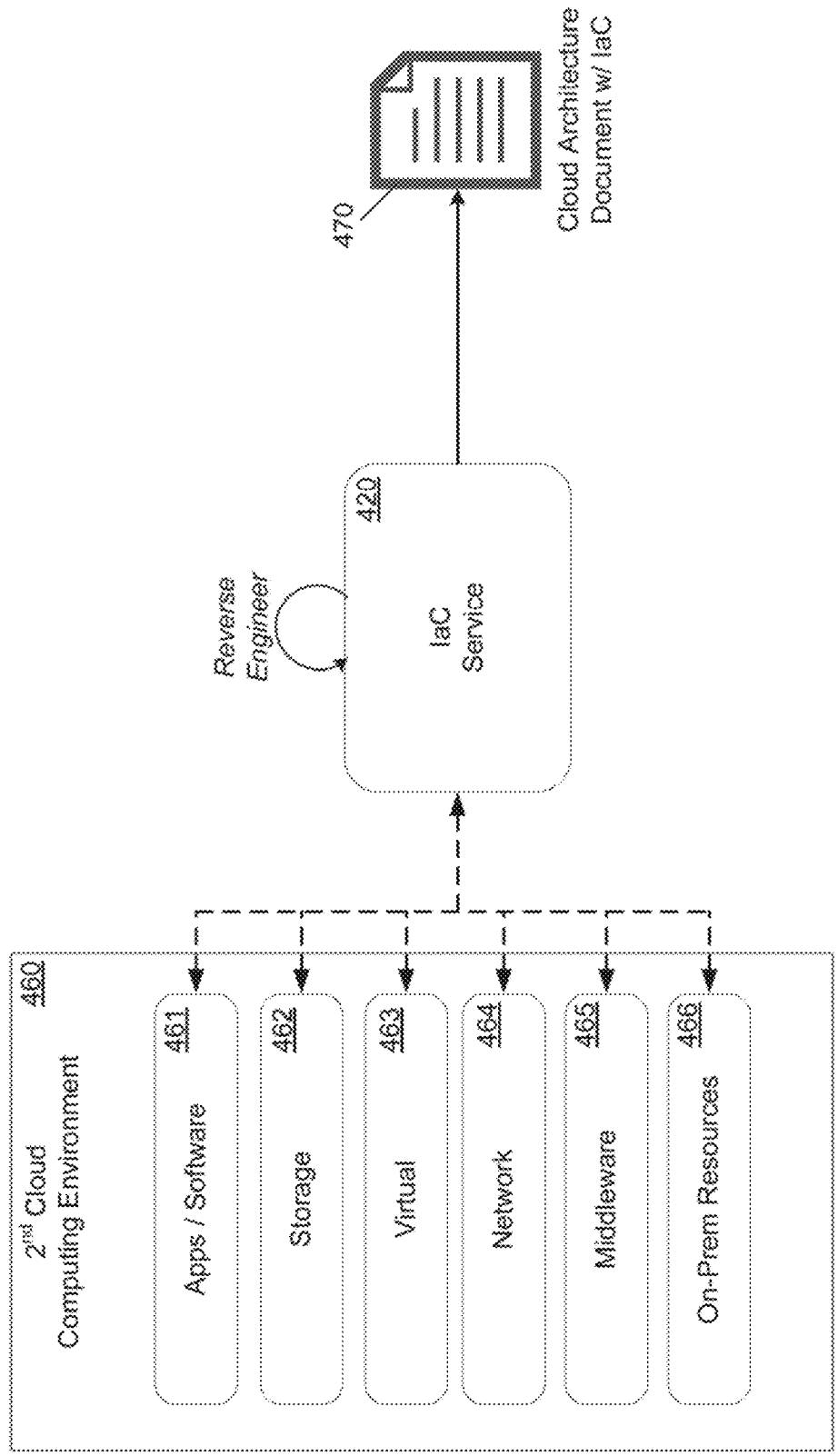
FIG. 4C is a diagram illustrating a process of reverse engineering a cloud computing architecture according to an example embodiment.

FIG. 4C illustrates a process 480 of reverse engineering a cloud computing architecture from a cloud computing environment 460 according to an example embodiment. In this example, the user may request that the IaC service 420 reverse engineer cloud resources 461, 462, 463, 464, 465, and 466, of an existing cloud computing environment 460 and create a cloud architecture document 470 with IaC based on the reverse engineering. Here, the user may specify which cloud resources to use or the IaC service 420 may automatically find all or a predefined list of infrastructure components.

In other words, rather than receive inputs via a user interface or receive an already designed cloud architecture document, the IaC service 420 can read configuration files from the platform and also identify the components within the infrastructure to create/recreate an architecture document accordingly. Furthermore, using the transformation process of the example embodiments the IaC service 420 may convert the identified components and configuration information into IaC and store it within a cloud architecture document 470.

As another example, the IaC service 420 described herein may receive a selection/input of multiple cloud architecture documents and merge the cloud architecture documents together into one combined cloud architecture document with IaC integrated therein. In this case, conflicts may occur between the two architecture documents. When this happens, the conflict may be identified and visualized (e.g., via highlighting, notifications, etc.) on an operator user interface with a request to resolve the conflict. As another example, the conflicts may be automatically resolved based on dependences, rules, etc.

In some embodiments, the IaC service 420 may include an artificial intelligence module (not shown) that is configured to learn from the architecture document that is being created. Here, the model can identify which code modules correspond to which components/cloud resources based on historical analysis. The AI module can learn from this analysis and make recommendations on IaC code based on such learning.

FIG. 5 illustrates a method 500 of generating an architecture document as infrastructure as code (IaC) according to an example embodiment. Referring to FIG. 5, in 510 the method may include storing, in memory, a cloud architecture document of a cloud computing environment. For example, the cloud architecture document may be designed via a user interface, uploaded as a file, selected from an existing set of cloud architecture documents, and the like.

In 520, the method may include transforming the cloud architecture document into infrastructure as code (IaC) based on predefined code and storing the IaC in a machine-readable file. For example, the machine-readable file may be the initial cloud architecture document which is modified to include the IaC. As another example, the machine-readable file may be a separate file. In 530, the method may include deploying the cloud computing environment via a host platform. In 540, the method may include executing the machine-readable file and automatically configuring cloud resources of the cloud computing environment based on the IaC included in the machine-readable file.

In some embodiments, the method may further include creating a cloud architecture diagram via a graphical user interface and converting cloud components displayed in the cloud architecture diagram into the IaC based on predefined code modules assigned to the cloud components. In some embodiments, the creating may include detecting drag-and-drop inputs via the graphical user interface and adding the cloud components to the cloud architecture diagram based on the detected drag-and-drop inputs. In some embodiments, the transforming may include receiving an input via the graphical user interface specifying one or more requirements of the cloud computing platform, and the transforming comprises dynamically modifying a cloud architecture document template based on the one or more requirements.

In some embodiments, the method may further include receiving a request to reverse engineer an architecture of a second cloud computing environment, and in response, automatically generating a second IaC corresponding to a second cloud architecture document representing the second cloud computing environment. In some embodiments, the automatically generating may include reading configuration settings of the second cloud computing environment from configuration files of the second cloud computing environment and dynamically generating the second IaC based on the read configuration settings.

In some embodiments, the transforming may include merging together components from two different cloud architecture documents based on predefined conflict settings and converting the merged components into the IaC. In some embodiments, the method may further include receiving modifications to the cloud architecture document of the cloud computing environment via the graphical user interface, and automatically updating the IaC in the machine-readable file to include the modifications.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
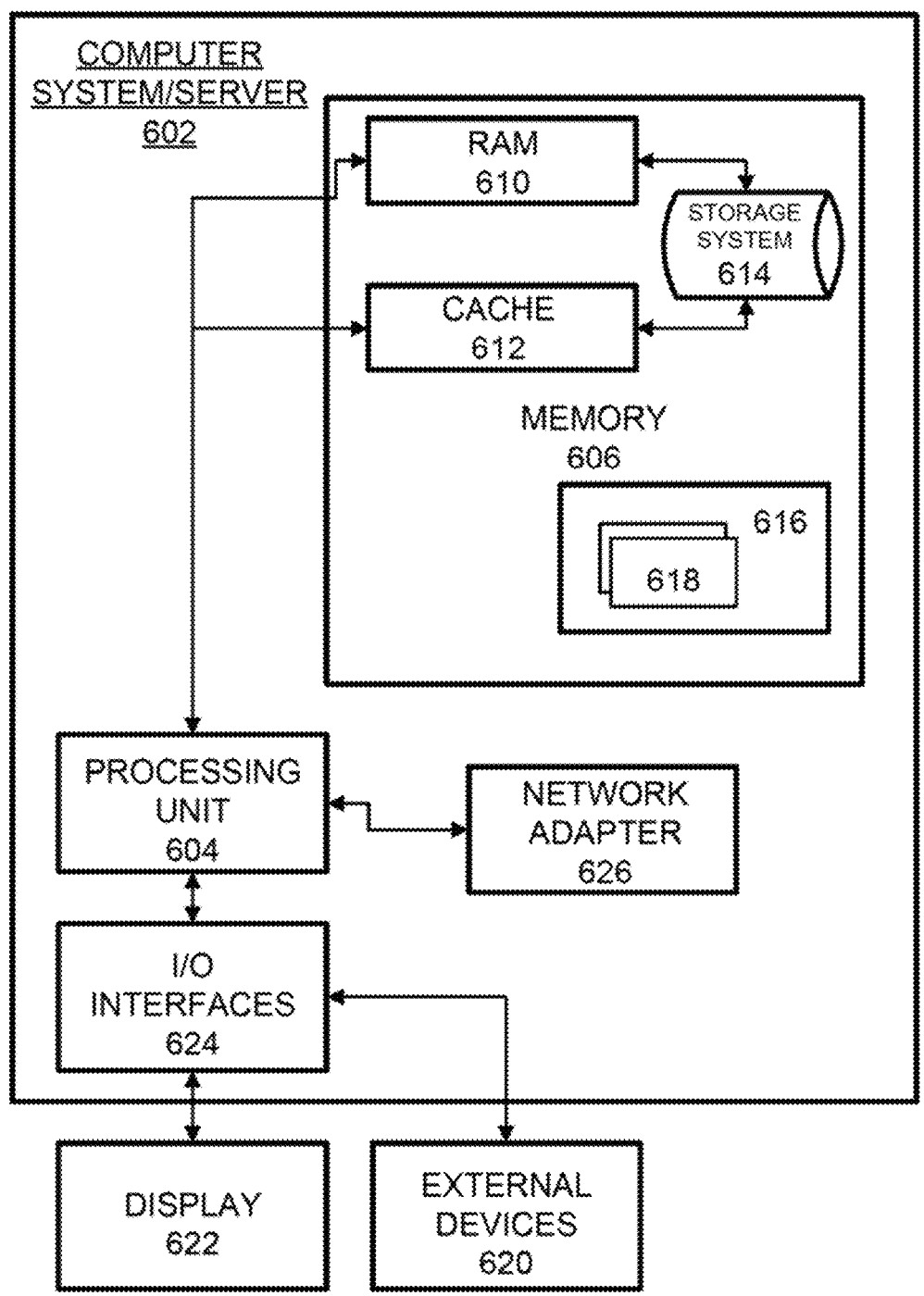
FIG. 6 is a diagram illustrating an example of a computing system that supports one or more of the example embodiments.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
   a memory configured to store a cloud architecture document comprising a diagram with visual representation of components of a cloud computing environment; and
   a processor configured to
      transform one or more visual representations of one or more cloud resources within the diagram of the cloud architecture document into infrastructure as code (IaC) based on predefined code and replace the one or more visual representations of the one or more cloud resources within the diagram of the cloud architecture document with the IaC;
      deploy the cloud computing environment via a host platform, and
      execute the transformed cloud architecture document and automatically configure cloud resources of the components within the cloud computing environment based on the IaC included in the diagram of the transformed cloud architecture document.

2. The apparatus of claim 1, wherein the processor is further configured to create the diagram based on inputs received via a graphical user interface and convert cloud components displayed in the diagram into the IaC based on predefined code modules assigned to the cloud components.

3. The apparatus of claim 2, wherein the processor is configured to detect drag-and-drop inputs via the graphical user interface and add the cloud components to the diagram based on the detected drag-and-drop inputs.

4. The apparatus of claim 1, wherein the processor is configured to receive an input via a graphical user interface which specifies one or more requirements of the cloud computing platform, and dynamically modify a predefined cloud architecture document template based on the one or more requirements.

5. The apparatus of claim 1, wherein the processor is further configured to detect a request to reverse engineer an architecture of a second cloud computing environment, and in response, automatically generate a second IaC that corresponds to a second cloud architecture document which represents the second cloud computing environment.

6. The apparatus of claim 5, wherein the processor is configured to read configuration settings of the second cloud computing environment from configuration files of the second cloud computing environment and dynamically generate the second IaC based on the read configuration settings.

7. The apparatus of claim 1, wherein the processor is configured to merge together components from two different cloud architecture documents based on predefined conflict settings and convert the merged components into the IaC.

8. The apparatus of claim 1, wherein the processor is configured to receive modifications to the cloud architecture document of the cloud computing environment via a graphical user interface, and automatically update the IaC previously stored in the transformed cloud architecture document to include the modifications.

9. A method comprising:
storing, in memory, a cloud architecture document comprising a diagram with visual representation of components of a cloud computing environment;
transforming one or more visual representations of one or more cloud resources within the cloud architecture document into infrastructure as code (IaC) based on predefined code and replacing the one or more visual representations of the one or more cloud resources within the diagram of the cloud architecture document with the IaC;
deploying the cloud computing environment via a host platform; and
executing the transformed cloud architecture document and automatically configuring cloud resources of the components within the cloud computing environment based on the IaC included in the diagram of the transformed cloud architecture document.

10. The method of claim 9, wherein the method further comprises creating the diagram based on inputs received via a graphical user interface and converting cloud components displayed in the diagram into the IaC based on predefined code modules assigned to the cloud components.

11. The method of claim 10, wherein the creating comprises detecting drag-and-drop inputs via the graphical user interface and adding the cloud components to the diagram based on the detected drag-and-drop inputs.

12. The method of claim 9, wherein the transforming comprises receiving an input via a graphical user interface specifying one or more requirements of the cloud computing platform, and the transforming comprises dynamically modifying a cloud architecture document template based on the one or more requirements.

13. The method of claim 9, wherein the method further comprises receiving a request to reverse engineer an architecture of a second cloud computing environment, and in response, automatically generating a second IaC corresponding to a second cloud architecture document representing the second cloud computing environment.

14. The method of claim 13, wherein the automatically generating comprises reading configuration settings of the second cloud computing environment from configuration files of the second cloud computing environment and dynamically generating the second IaC based on the read configuration settings.

15. The method of claim 9, wherein the transforming comprises merging together components from two different cloud architecture documents based on predefined conflict settings and converting the merged components into the IaC.

16. The method of claim 9, wherein the method further comprises receiving modifications to the cloud architecture document of the cloud computing environment via a graphical user interface, and automatically updating the IaC previously stored in the transformed cloud architecture document to include the modifications.

17. A computer-readable storage medium comprising instructions, that when read by a processor, cause the processor to perform a method comprising:
storing, in memory, a cloud architecture document comprising a diagram with visual representation of components of a cloud computing environment;
transforming one or more visual representations of one or more cloud resources within the diagram of the cloud architecture document into infrastructure as code (IaC) based on predefined code and replacing the one or more visual representations of the one or more cloud resources within the diagram of the cloud architecture document with the IaC;
deploying the cloud computing environment via a host platform; and
executing the transformed cloud architecture document and automatically configuring cloud resources of the components within the cloud computing environment based on the IaC included in the diagram of the transformed cloud architecture document.

18. The computer-readable storage medium of claim 17, wherein the method further comprises creating the diagram based on inputs received via a graphical user interface and converting cloud components displayed in the diagram into the IaC based on predefined code modules assigned to the cloud components.

19. The computer-readable storage medium of claim 17, wherein the transforming comprises receiving an input via a graphical user interface specifying one or more requirements of the cloud computing platform, and the transforming comprises dynamically modifying a cloud architecture document template based on the one or more requirements.

20. The apparatus of claim 1, wherein the processor is configured to store the IaC in the diagram of the cloud architecture document at a same location as the one or more visual representations of the one or more cloud resources within the diagram of the cloud architecture document.

* * * * *